(12) United States Patent
Chen et al.

(10) Patent No.: US 10,547,538 B2
(45) Date of Patent: Jan. 28, 2020

(54) PACKET FORWARDING METHOD AND APPARATUS

(71) Applicant: ZTE CORPORATION, Shenzhen (CN)

(72) Inventors: Ran Chen, Shenzhen (CN); Shaofu Peng, Shenzhen (CN); Qingning Li, Shenzhen (CN)

(73) Assignee: ZTE CORPORATION, Shenzhen, Guangdong (CN)

( * ) Notice: Subject to any disclaimer, the term of this patent is extended or adjusted under 35 U.S.C. 154(b) by 0 days.

(21) Appl. No.: 16/083,242

(22) PCT Filed: Aug. 9, 2016

(86) PCT No.: PCT/CN2016/094210
§ 371 (c)(1),
(2) Date: Sep. 7, 2018

(87) PCT Pub. No.: WO2017/152576
PCT Pub. Date: Sep. 14, 2017

(65) Prior Publication Data
US 2019/0116114 A1    Apr. 18, 2019

(30) Foreign Application Priority Data
Mar. 8, 2016    (CN) .......................... 2016 1 0130354

(51) Int. Cl.
*H04L 12/707*    (2013.01)
*H04L 12/761*    (2013.01)
(Continued)

(52) U.S. Cl.
CPC .............. *H04L 45/24* (2013.01); *H04L 45/16* (2013.01); *H04L 45/28* (2013.01); *H04L 45/48* (2013.01)

(58) Field of Classification Search
CPC ....................................................... H04L 45/24
(Continued)

(56) References Cited

U.S. PATENT DOCUMENTS 9,438,432 B2 *    9/2016   Shepherd ................ H04L 45/74
2015/0078377 A1    3/2015   Wijnands et al.
(Continued)

FOREIGN PATENT DOCUMENTS

CN            104811387 A        7/2015

OTHER PUBLICATIONS

International Search Report in international application No. PCT/CN2016/094210, dated Dec. 7, 2016, 2 pgs.
(Continued)

*Primary Examiner* — Peter G Solinsky
(74) *Attorney, Agent, or Firm* — Li & Cai Intellectual Property (USA) Office

(57) ABSTRACT

Disclosed is a packet forwarding method, comprising: receiving a packet to be sent to a bit-forwarding egress router (BFER) based on traffic engineering for bit index explicit replication (BIER-TE), and a path identifier, wherein the path identifier is used for indicating that the packet is sent from a first bit-forwarding router (BFR) to a primary path and a backup path of a next-hop BFR of the first BFR; determining, according to the path identifier, a bit string used for forwarding the packet to the BFER; and filling the bit string in the packet and forwarding the packet according to the bit string.

20 Claims, 14 Drawing Sheets

---

A path identifier for use in forwarding a packet is determined, herein the path identifier is used for indicating a primary path and a backup path through which the packet is sent from a first BFR to a next-hop BFR of the first BFR  — S302

The determined path identifier is issued to a BFR in a BIER-TE, herein the path identifier is for use in forwarding the packet by the BFR  — S304

(51) Int. Cl.
*H04L 12/703* (2013.01)
*H04L 12/753* (2013.01)

(58) Field of Classification Search
USPC .......................................................... 370/217
See application file for complete search history.

(56) References Cited

U.S. PATENT DOCUMENTS

| | | | |
|---|---|---|---|
| 2015/0078378 | A1 | 3/2015 | Wijnands et al. |
| 2015/0078379 | A1 | 3/2015 | Wijnands et al. |
| 2015/0078380 | A1 | 3/2015 | Wijnands et al. |
| 2015/0085635 | A1 | 3/2015 | Wijnands et al. |
| 2015/0131658 | A1 | 5/2015 | Wijnands et al. |
| 2015/0131659 | A1 | 5/2015 | Wijnands et al. |
| 2015/0131660 | A1 | 5/2015 | Shepherd et al. |
| 2015/0138961 | A1 | 5/2015 | Wijnands et al. |
| 2015/0139228 | A1 | 5/2015 | Wijnands et al. |
| 2015/0181309 | A1 | 6/2015 | Shepherd et al. |
| 2016/0254987 | A1* | 9/2016 | Eckert ................. H04L 12/4633 370/390 |
| 2018/0278470 | A1 | 9/2018 | Wijnands et al. |

OTHER PUBLICATIONS

English Translation of the Written Opinion of the International Search Authority in international application No. PCT/CN2016/094210, dated Dec. 7, 2016, 3 pgs.

IETE."Traffic Engineering for Bit Index Explicit Replication BIER-TE" Mar. 5, 2015, T. Eckert, draft-eckert-bier-te-arch-00, Network Working Group, Internet-Draft, Intended status: Standard Track, 25 pgs.

IETE."Multicast using Bit Index Explicit Replication" Mar. 6, 2015, Ij. Wijnands, E. Rosen, A. Dolganow, T. Przygienda, and S. Aldrin, Internet Engineering Task Force Internet-Draft Intended status: Standards Track, 30 pgs.

"Traffic Engineering for Bit Index Explicit Replication BIER-TE" draft-eckert-bier-te-arch-02, Oct. 18, 2015, T. Eckert and G. Cauchie, Network Working Group, Internet-Draft, Intended status: Standard Track, 25 pgs.

Supplementary European Search Report in European application No. 16893221.8, dated Jan. 7, 2019, 7 pgs.

"Traffic Enginering for Bit Index Explicit Replication BIER-TE;draft-eckert-bier-te-arch-01.txt"; T. Eckert and G. Cauchie; Jul. 5, 2015; Internei Engineering Task Force, IETF: Standardworkingdraft. Internet Society (ISOC) 4. Rue Des Falaises CH-1205 Geneva, Switzerland,6, pp. 1-23.

"Multicast using Bit Index Explicit Replication;draft-ietf-bier-architecture-02.txt"; Ij. Wynands, E. Rosen, A. Dolganow, T. Prgyzienda and S. Aldrin; Jul. 29, 2015; Internet-Draft: Internet Engineering Task Force, Internet Engineering Task Force, IETF: Standardworkingdraft. Internet Society (ISOC) 4, Rue Des Falaises CH 1205 GE,No. 2, pp. 1-36.

* cited by examiner

| Index: SI:BitPosition | Adjacencies Type | Adjacencies: | Forwarding information |
|---|---|---|---|
| 0:2 | Connected | Interface2, BFR1 | Interface2, BFR1 |
| 0:12 | FRR | Primary (interface1,BFR2) | Primary: Interface1, BFR2 |
| | | Backup (interface2,BFR1; interface3, BFR2) | Backup: Interface2, BFR1, RestBitMsdk: P12, AddBitmask: P3 |

FIG. 5

| FRR Adjacency Index | BitPosition | ResetBitmask | AddBitmask |
|---|---|---|---|
| 0:1 | 5 | ..0010000 | ..01000000 |

FIG. 8

| Index: SI:BitPosition | Adjacencies Type | Adjacencies: | Forwarding information |
|---|---|---|---|
| 0:3 | Connected | Interface3, BFR2 | Interface3, BFR2 |
| 0:12 | FRR | Primary (interface2,BFR3) | Primary: Interface2, BFR3 |
| | | Backup (interface3,BFR2; interface4, BFR3) | Backup: Interface3, BFR2, RestBitMsdk: P12, AddBitmask: P5 |
| 0:13 | FRR | Primary (interface2,BFR3) | Primary: Interface2, BFR3 |
| | | Backup (interface1,BFR1; interface5, BFR3) | Backup: Interface1, BFR1, RestBitMsdk: P13, AddBitmask: P4 |

FIG. 10

PACKET FORWARDING METHOD AND APPARATUS

TECHNICAL FIELD

The disclosure relates, but is not limited, to the technical field of communications, and in particular to a packet forwarding method and device.

BACKGROUND

With the rapid development of a Software Defined Network (SDN) technology and Network Function Virtualization (NFV) in these years, network deployment is becoming more controllable, and control complexity is also getting higher and higher. In particular, control means for intermediate networks such as core networks and convergence networks are more and more complicated in order to adapt to different services and meet different deployment requirements. In particular, the number of intermediate network node states required for multicast applications such as a Multicast Virtual Private Network (MVPN) and an Internet Protocol Television (IPTV) is increased exponentially.

To this end, the industry has proposed a new technology for constructing multicast forwarding paths, called a Bit Indexed Explicit Replication (BIER) technology. The BIER technology can greatly reduce the protocol complexity and intermediate state of an intermediate network by completely transforming a forwarding layer. The network forwarding is simplified to be based only on bits, subverts the traditional Internet Protocol (IP) forwarding, can easily realize the transmission of multicast traffic in the intermediate network without recording, by the intermediate network, any multicast traffic status, and greatly facilitates network operation and maintenance.

BIER is a bit-based multicast replication technology. In a BIER domain, each Bit-Forwarding Egress Router (BFER) is assigned with a globally unique bit position in the entire BIER sub-domain. Each BFER floods the BIER domain with its own bit position using an Interior Gateway Protocol (IGP). All bit positions form a bitstring, and the transfer and routing of a data packet in the BIER domain depends on the bitstring. When a packet header containing the BIER is received by other Bit Forwarding Routers (BFR), the packet header is forwarded according to the bitstring carried in the BIER header based on a bit forwarding table. This principle of forwarding based on a BIER bit greatly reduces the forwarding cost of a network.

Bit Index Explicit Replication-Traffic Engineering (BIER-TE) is similar to BIER. It forwards and replicates packets according to BitString in the packet header, but the key differences of BIER-TE and BIER are as follows:

1) An explicit path calculated using a BIER-TE controller replaces automatic path calculation within a network.

2) Each bit position in a BitString represents one or more adjacencies, not a BFER.

3) Only a BIER-TE Forwarding Table (BIFT) is required on the BFR, and no routing table is required.

At present, the way to protect a path in BIER-TE in the related art is mainly for explicitly creating a unique backup path for a certain path. This solution may cause that the path only exists in a Fast Re-Route (FRR) entry. However, when a link belongs to multiple FRR entries, the correct and reasonable configuration path protection cannot be implemented, resulting in waste of resources.

SUMMARY

The following is a brief introduction for a subject described herein in detail. The brief introduction is not intended to restrict the scope of protection of claims.

The embodiments of the disclosure provide a packet forwarding method and device, intended to at least solve the problem in the related art that a configuration path cannot be correctly and reasonably protected, resulting in waste of resources.

In an aspect, a packet forwarding method is provided. The method includes that: a packet to be sent to a BFER in a BIER-TE and a path identifier are received, herein the path identifier is used for indicating a primary path and a backup path through which the packet is sent from a first BFR to a next-hop BFR of the first BFR; a bitstring for use in forwarding the packet to the BFER is determined according to the path identifier; and the bitstring is filled into the packet, and the packet is forwarded according to the bitstring.

Alternatively, the path identifier includes: an adjacency identification (ID) allocated by entirely taking the primary path and the backup path as an FRR adjacency.

Alternatively, the primary path has a capability of forming different FRR adjacencies with different backup paths.

Alternatively, the backup path includes a path composed of two or more segments, or the backup path includes a tree path.

Alternatively, the operation that the packet is forwarded according to the bitstring includes that: the packet is forwarded to the first BFR according to the bitstring, herein in the case where it is determined that the primary path is normal, the first BFR forwards the packet to the next-hop BFR of the first BFR through the primary path; in the case where it is determined that the primary path fails, the first BFR forwards the packet to the next-hop BFR of the first BFR through the backup path.

Alternatively, the operation that the first BFR forwards the packet to the next-hop BFR of the first BFR through the backup path includes that: the first BFR replaces the path identifier in the bitstring filled into the packet with an identifier of the backup path; and the first BFR forwards the packet to the next-hop BFR of the first BFR through the backup path according to the identifier of the backup path.

Alternatively, a BIFT corresponding to the path identifier includes information of the primary path and information of the backup path, herein the information of the primary path includes at least one of information of an egress on the primary path or information of the next-hop BFR; and/or, the information of the backup path includes at least one of information of an egress on the first path segment on the backup path or information of the next-hop BFR, together with an AddBitmask, and a ResetBitMask, herein the AddBitmask is used for identifying other path segments after the first path segment on the backup path, and the ResetBitMask includes path identifiers required to be cleared, including the path identifier.

Alternatively, the BIFT is issued by a controller.

Alternatively, the path identifier is issued by the controller.

In another aspect, a packet forwarding method is provided. The method includes that: a packet to be sent to a BFER in a BIER-TE is received; and the packet is forwarded according to a path identifier in a bitstring filled into the packet, herein the path identifier in the bitstring is used for indicating a primary path and a backup path through which the packet is sent to a next-hop BFER.

Alternatively, the path identifier includes: an adjacency ID allocated by entirely taking the primary path and the backup path as an FRR adjacency.

Alternatively, the primary path has a capability of forming different FRR adjacencies with different backup paths.

Alternatively, the backup path includes a path composed of two or more segments, or the backup path includes a tree path.

Alternatively, the operation that the packet is forwarded according to a path identifier in a bitstring filled into the packet includes that: in the case where it is determined that the primary path is normal, the packet is forwarded to the next-hop BFR through the primary path; in the case where it is determined that the primary path fails, the packet is forwarded to the next-hop BFR through the backup path.

Alternatively, the operation that the packet is forwarded to the next-hop BFR through the backup path includes that: the path identifier in the bitstring filled into the packet is replaced with an identifier of the backup path; and the packet is forwarded to the next-hop BFR through the backup path according to the identifier of the backup path.

Alternatively, a BIFT corresponding to the path identifier includes information of the primary path and information of the backup path, herein the information of the primary path includes at least one of information of an egress on the primary path or information of the next-hop BFR; and/or, the information of the backup path includes at least one of information of an egress on the first path segment on the backup path or information of the next-hop BFR, together with an AddBitmask, and a ResetBitMask, herein the AddBitmask is used for identifying other path segments after the first path segment on the backup path, and the ResetBitMask includes path identifiers required to be cleared, including the path identifier.

Alternatively, the BIFT is issued by a controller.

In another aspect, a packet forwarding method is provided. The method includes that: a path identifier for use in forwarding a packet is determined, herein the path identifier is used for indicating a primary path and a backup path through which the packet is sent from a first BFR to a next-hop BFR of the first BFR; and the determined path identifier is issued to a BFR in a BIER-TE, herein the path identifier is for use in forwarding the packet by the BFR.

Alternatively, the path identifier includes: an adjacency ID allocated by entirely taking the primary path and the backup path as an FRR adjacency.

Alternatively, the primary path has a capability of forming different FRR adjacencies with different backup paths.

Alternatively, the backup path includes a path composed of two or more segments, or the backup path includes a tree path.

Alternatively, a BIFT corresponding to the path identifier includes information of the primary path and information of the backup path, herein the information of the primary path includes at least one of information of an egress on the primary path or information of a next-hop BFR; and/or, the information of the backup path includes at least one of information of an egress on the first path segment on the backup path or information of a next-hop BFR, together with an AddBitmask, and a ResetBitMask, herein the AddBitmask is used for identifying other path segments after the first path segment on the backup path, and the ResetBitMask includes path identifiers required to be cleared, including the path identifier.

In another aspect, a packet forwarding device is provided. The device includes: a first receiving module arranged to receive a packet to be sent to a BFER in a BIER-TE and a path identifier, herein the path identifier is used for indicating a primary path and a backup path through which the packet is sent from a first BFR to a next-hop BFR of the first BFR; a first determination module arranged to determine a bitstring for use in forwarding the packet to the BFER according to the path identifier; and a first forwarding module arranged to fill the bitstring into the packet and forward the packet according to the bitstring.

In another aspect, a packet forwarding device is provided. The device includes: a second receiving module arranged to receive a packet to be sent to a BFER in a BIER-TE; and a second forwarding module arranged to forward the packet according to a path identifier in a bitstring filled into the packet, herein the path identifier in the bitstring is used for indicating a primary path and a backup path through which the packet is sent to a next-hop BFR.

In another aspect, a packet forwarding device is provided. The device includes: a second determination module arranged to determine a path identifier for use in forwarding a packet, herein the path identifier is used for indicating a primary path and a backup path through which the packet is sent from a first BFR to a next-hop BFR of the first BFR; and an issuing module arranged to issue the determined path identifier to a BFR in a BIER-TE, herein the path identifier is for use in forwarding the packet by the BFR.

The embodiments of the disclosure also provide a computer-readable storage medium storing a computer-executable instruction. The computer-executable instruction is executed by a processor to implement the above method.

By means of the embodiments of the disclosure, a packet to be sent to a BFER in a BIER-TE and a path identifier are received, herein the path identifier is used for indicating a primary path and a backup path through which the packet is sent from a first BFR to a next-hop BFR of the first BFR; a bitstring for use in forwarding the packet to the BFER is determined according to the path identifier; and the bitstring is filled into the packet, and the packet is forwarded according to the bitstring. The problem in the related art that a configuration path cannot be correctly and reasonably protected to result in waste of resources is solved, thereby achieving the effect of reasonably and effectively protecting a configuration path to avoid waste of resources.

After the drawings and the detailed descriptions are read and understood, other aspects may be understood.

BRIEF DESCRIPTION OF DRAWINGS

FIG. 5 is an FRR forwarding table according to a first embodiment of the disclosure.

FIG. 8 is an Adjacency FRR entry in the related art.

FIG. 10 is an FRR forwarding table according to a third embodiment of the disclosure.

DETAILED DESCRIPTION

The embodiments of the disclosure will be described in detail below with reference to the accompanying drawings. It is to be noted that in the case of no conflict, the features in the embodiments and the embodiments in the present application may be arbitrarily combined with each other.

Figure 1:
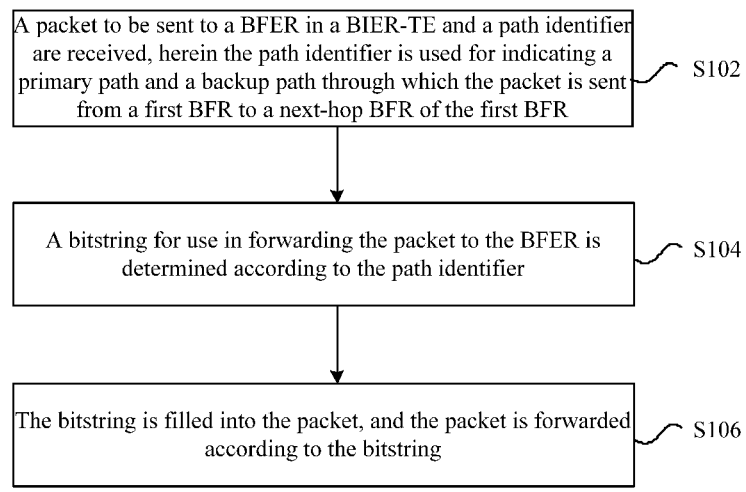
FIG. 1 is a flowchart of a first packet forwarding method according to an embodiment of the disclosure.

A packet forwarding method is provided in the present embodiment. FIG. 1 is a flowchart of a first packet forwarding method according to an embodiment of the disclosure. As shown in FIG. 1, the flow includes the operations as follows.

At S102, a packet to be sent to a BFER in a BIER-TE and a path identifier are received, herein the path identifier is used for indicating a primary path and a backup path through which the packet is sent from a first BFR to a next-hop BFR of the first BFR.

At S104, a bitstring for use in forwarding the packet to the BFER is determined according to the path identifier.

At S106, the bitstring is filled into the packet, and the packet is forwarded according to the bitstring.

The above operation may be performed by a Bit-Forwarding Ingress Router (BFIR) in the BIER-TE. The first BFR may be a BFR other than the BFIR and the BFER. The bitstring may be composed of one or more path identifiers.

Through the above operations, the path identifier may identify the primary path and the backup path through which the packet is forwarded. In actual configuration, the content indicated by the path identifier may be arranged according to the specific situation of the path, that is, the primary path and the backup path are arranged. Thus, the problem in the related art that a configuration path cannot be correctly and reasonably protected to result in waste of resources can be effectively solved, thereby achieving the effect of reasonably and effectively protecting a configuration path to avoid waste of resources.

In an alternative embodiment, the path identifier includes: an adjacency ID allocated by entirely taking the primary path and the backup path as an FRR adjacency. That is, the primary path and the backup path may be simultaneously represented by one identifier, so that it is not necessary to change the structure of the bitstring, and the original bitstring configuration manner may be used.

In an alternative embodiment, the primary path may form different FRR adjacencies with different backup paths. In the present embodiment, a primary path may correspond to more than two backup paths. When the primary path reaches different next-hop BFRs, different backup paths may be arranged for the primary path, thereby avoiding the problem of using only one backup path and not using other backup paths.

In an alternative embodiment, the backup path includes a path composed of two or more segments, or the backup path includes a tree path. It is to be noted that the type of the backup path in the present embodiment is only two examples, and other reasonable types of backup paths may also be used, which are not enumerated here.

In an alternative embodiment, the operation that the packet is forwarded according to the bitstring includes that: the packet is forwarded to the first BFR according to the bitstring, herein in the case where it is determined that the primary path is normal, the first BFR forwards the packet to the next-hop BFR of the first BFR through the primary path; in the case where it is determined that the primary path fails, the first BFR forwards the packet to the next-hop BFR of the first BFR through the backup path. Certainly, the respective usage conditions of the primary and backup paths are only an example, and the primary and backup paths may be reasonably used under other conditions. For example, when the primary path does not fail, but the load on the primary path exceeds a certain threshold, the backup path may be used, or the time period in which the primary path or the backup path is used may also be pre-arranged. In the time period for using the primary path, the primary path is used for packet forwarding. In the time period for using the backup path, the backup path is used for packet forwarding.

In an alternative embodiment, the operation that the first BFR forwards the packet to the next-hop BFR of the first BFR through the backup path includes that: the first BFR replaces the path identifier in the bitstring filled into the packet with an identifier of the backup path; and the first BFR forwards the packet to the next-hop BFR of the first BFR through the backup path according to the identifier of the backup path. The path identifier is replaced with the identifier of the backup path, so that the next-hop BFR explicitly determines a path through which the packet is forwarded, and the packet can be correctly forwarded.

In an alternative embodiment, a BIFT corresponding to the path identifier includes information of the primary path and information of the backup path, herein the information of the primary path includes at least one of information of an egress on the primary path or information of a next-hop BFR; and/or, the information of the backup path includes at least one of information of an egress on the first path segment on the backup path or information of a next-hop BFR, together with an AddBitmask, and a ResetBitMask, herein the AddBitmask is used for identifying other path segments after the first path segment on the backup path, and the ResetBitMask includes path identifiers required to be cleared, including the path identifier.

In an alternative embodiment, the BIFT may be issued by a controller.

In an alternative embodiment, the path identifier may be issued by the controller.

Figure 2:
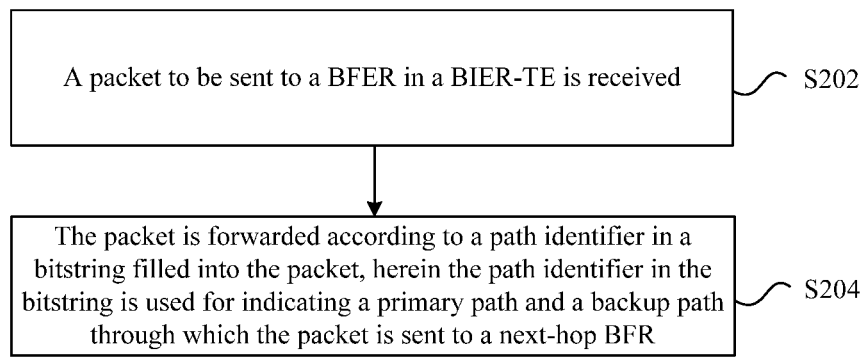
FIG. 2 is a flowchart of a second packet forwarding method according to an embodiment of the disclosure.

A packet forwarding method is also provided in the present embodiment. FIG. 2 is a flowchart of a second packet forwarding method according to an embodiment of the disclosure. As shown in FIG. 2, the flow includes the operations as follows.

At S202, a packet to be sent to a BFER in a BIER-TE is received.

At S204, the packet is forwarded according to a path identifier in a bitstring filled into the packet, herein the path identifier in the bitstring is used for indicating a primary path and a backup path through which the packet is sent to a next-hop BFR.

The above operation may be performed by a BFR (such as the above first BFR) other than the BFIR and the BFER in the BIER-TE. The bitstring may be composed of one or more path identifiers.

Through the above operations, the path identifier may identify the primary path and the backup path through which the packet is forwarded. In actual configuration, the content indicated by the path identifier may be arranged according to the specific situation of the path, that is, the primary path and the backup path are arranged. Thus, the problem in the related art that a configuration path cannot be correctly and reasonably protected to result in waste of resources can be effectively solved, thereby achieving the effect of reasonably and effectively protecting a configuration path to avoid waste of resources.

In an alternative embodiment, the path identifier includes: an adjacency ID allocated by entirely taking the primary path and the backup path as an FRR adjacency. That is, the primary path and the backup path may be simultaneously represented by one identifier, so that it is not necessary to change the structure of the bitstring, and the original bitstring configuration manner may be used.

In an alternative embodiment, the primary path may form different FRR adjacencies with different backup paths. In the present embodiment, a primary path may correspond to more than two backup paths. When the primary path reaches different next-hop BFRs, different backup paths may be arranged for the primary path, thereby avoiding the problem of using only one backup path and not using other backup paths.

In an alternative embodiment, the backup path includes a path composed of two or more segments, or the backup path includes a tree path. It is to be noted that the type of the backup path in the present embodiment is only two examples, and other reasonable types of backup paths may also be used, which are not enumerated here.

In an alternative embodiment, the operation that the packet is forwarded according to a path identifier in a bitstring filled into the packet includes that: in the case where it is determined that the primary path is normal, the packet is forwarded to the next-hop BFR through the primary path; in the case where it is determined that the primary path fails, the packet is forwarded to the next-hop BFR through the backup path. Certainly, the respective usage conditions of the primary and backup paths are only an example, and the primary and backup paths may be reasonably used under other conditions. For example, when the primary path does not fail, but the load on the primary path exceeds a certain threshold, the backup path may be used, or the time period in which the primary path or the backup path is used may also be pre-arranged. In the time period for using the primary path, the primary path is used for packet forwarding. In the time period for using the backup path, the backup path is used for packet forwarding.

In an alternative embodiment, the operation that the packet is forwarded to the next-hop BFR through the backup path includes that: the path identifier in the bitstring filled into the packet is replaced with an identifier of the backup path; and the packet is forwarded to the next-hop BFR through the backup path according to the identifier of the backup path.

In an alternative embodiment, a BIFT corresponding to the path identifier includes information of the primary path and information of the backup path, herein the information of the primary path includes at least one of information of an egress on the primary path or information of a next-hop BFR; and/or, the information of the backup path includes at least one of information of an egress on the first path segment on the backup path or information of a next-hop BFR, together with an AddBitmask, and a ResetBitMask, herein the AddBitmask is used for identifying other path segments after the first path segment on the backup path, and the ResetBitMask includes path identifiers required to be cleared, including the path identifier.

In an alternative embodiment, the BIFT is issued by a controller.

Figure 3:
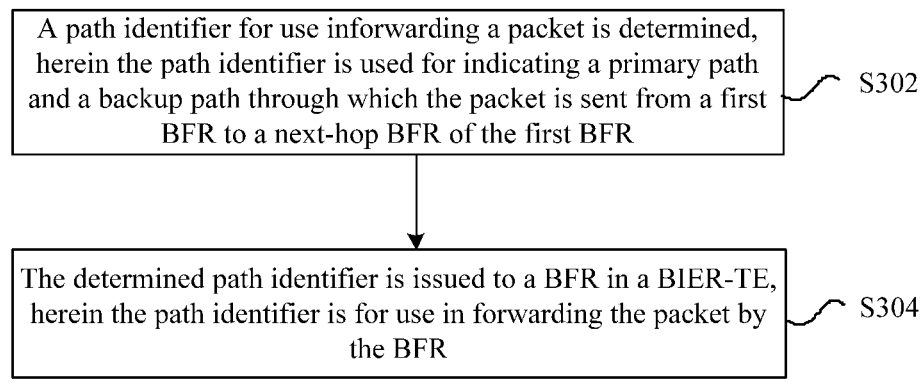
FIG. 3 is a flowchart of a third packet forwarding method according to an embodiment of the disclosure.

A packet forwarding method is also provided in the present embodiment. FIG. 3 is a flowchart of a third packet forwarding method according to an embodiment of the disclosure. As shown in FIG. 3, the flow includes the operations as follows.

At S302, a path identifier for use in forwarding a packet is determined, herein the path identifier is used for indicating a primary path and a backup path through which that the packet is sent from a first BFR to a next-hop BFR of the first BFR.

At S304, the determined path identifier is issued to a BFR in a BIER-TE, herein the path identifier is for use in forwarding the packet by the BFR.

The above operation may be executed by a controller.

Through the above operations, the path identifier may identify the primary path and the backup path through which the packet is forwarded. In actual configuration, the content indicated by the path identifier may be arranged according to the specific situation of the path, that is, the primary path and the backup path are arranged. Thus, the problem in the related art that a configuration path cannot be correctly and reasonably protected to result in waste of resources can be effectively solved, thereby achieving the effect of reasonably and effectively protecting a configuration path to avoid waste of resources.

In an alternative embodiment, the path identifier includes: an adjacency ID allocated by entirely taking the primary path and the backup path as an FRR adjacency. That is, the primary path and the backup path may be simultaneously represented by one identifier, so that it is not necessary to change the structure of the bitstring, and the original bitstring configuration manner may be used.

In an alternative embodiment, the primary path may form different FRR adjacencies with different backup paths. In the present embodiment, a primary path may correspond to more than two backup paths. When the primary path reaches different next-hop BFRs, different backup paths may be arranged for the primary path, thereby avoiding the problem of using only one backup path and not using other backup paths.

In an alternative embodiment, the backup path includes a path composed of two or more segments, or the backup path includes a tree path. It is to be noted that the type of the backup path in the present embodiment is only two examples, and other reasonable types of backup paths may also be used, which are not enumerated here.

Alternatively, a BIFT corresponding to the path identifier carried in the bitstring includes information of the primary path and information of the backup path, herein the information of the primary path includes at least one of information of an egress on the primary path or information of a next-hop BFR; and/or, the information of the backup path includes at least one of information of an egress on the first path segment on the backup path or information of a next-hop BFR, together with an AddBitmask, and a ResetBitMask, herein the AddBitmask is used for identifying other path segments after the first path segment on the backup path, and the ResetBitMask includes path identifiers required to be cleared, including the path identifier.

It can be seen from the above embodiment that in the embodiment of the disclosure, the primary and backup paths are entirely taken as an FRR adjacency, and the corresponding adjacency id is allocated. Then, a primary path (generally just a direct link) may form different FRRs with different backup paths (the backup paths may be paths or trees composed of multiple segments). Alternatively, a BIFT entry corresponding to the corresponding FRR adjacency includes primary and backup forwarding information (the primary forwarding information is an egress/next hop, and the backup forwarding information includes an egress/next hop of the first segment, also includes an AddBitmask indicating other subsequent segments, and includes a Reset-BitMask for avoiding duplicate replication of a packet).

The disclosure will be described below in conjunction with specific embodiments.

First Embodiment

Figure 4:
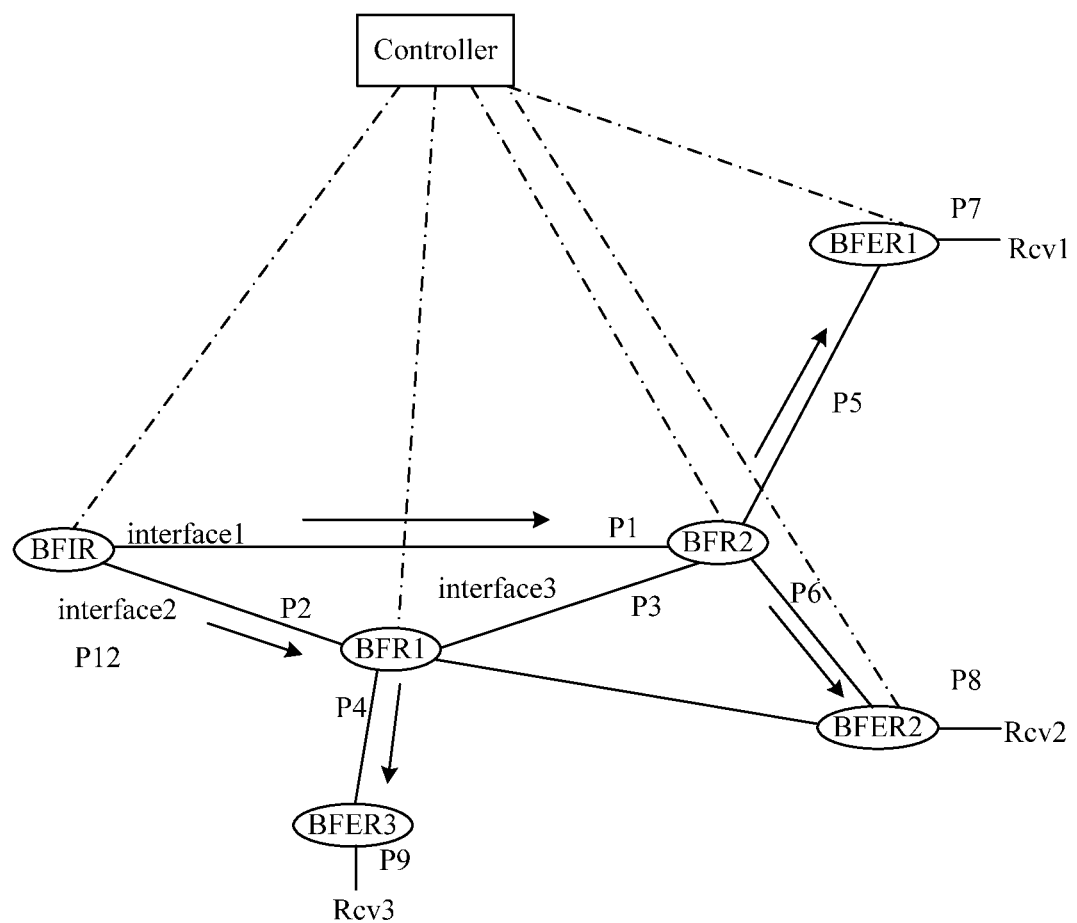
FIG. 4 is a forwarding diagram of a BIER FRR packet according to a first embodiment of the disclosure.

FIG. 4 is a forwarding diagram of a BIER FRR packet according to a first embodiment of the disclosure. FIG. 5 is an FRR forwarding table according to a first embodiment of the disclosure. As shown in FIG. 4, Pxx represents a bit allocated to a link by a controller. For example, P1 in FIG. 4 represents that the controller allocates P1 to the link of BFIR to BFR2, P2 represents that the controller allocates P2 to the link of BFIR to BFR1, and P12 represents that the controller allocates P12 to the FRR of BFIR to BFR2 (a primary path is BFIR-BFR2, and a backup path is BFIR-BFR1-BFR2). The flow in the present embodiment will be described below with reference to FIG. 4 and FIG. 5, including the operations as follows.

At S401, when a multicast data packet arrives at a BFIR node, an original BitString is generated as P2, P4, P9, P12, P5, P6, P7, and P8, as shown in FIG. 4.

At S402, a BFIR forwards a packet according to the BitString, and a BIFT table on the BFIR includes two entries: P2 and P12. Therefore, the packet matches P2 and P12 respectively.

The BIFT table on the BFIR is shown in FIG. 5. An adjacency specified by the P2 entry refers to forwarding to BFR1 through a link BFIR-BFR1, and an adjacency specified by the P12 entry refers to forwarding to BFR2 through a link BFIR-BFR2. Then, a BFIR finally replicates two packets, one is forwarded to BFR1 through the link BFIR-BFR1, and one is forwarded to BFR2 through the link BFIR-BFR2. Both of the two packets have P2 and P12 bits in the BitString being cleared before being sent.

At S403, after receiving a multicast packet, the other BIER nodes also match a local forwarding entry of the BIER node through the packet, and after matching, the multicast packet is forwarded according to the forwarding entry.

Second Embodiment

Figure 6:
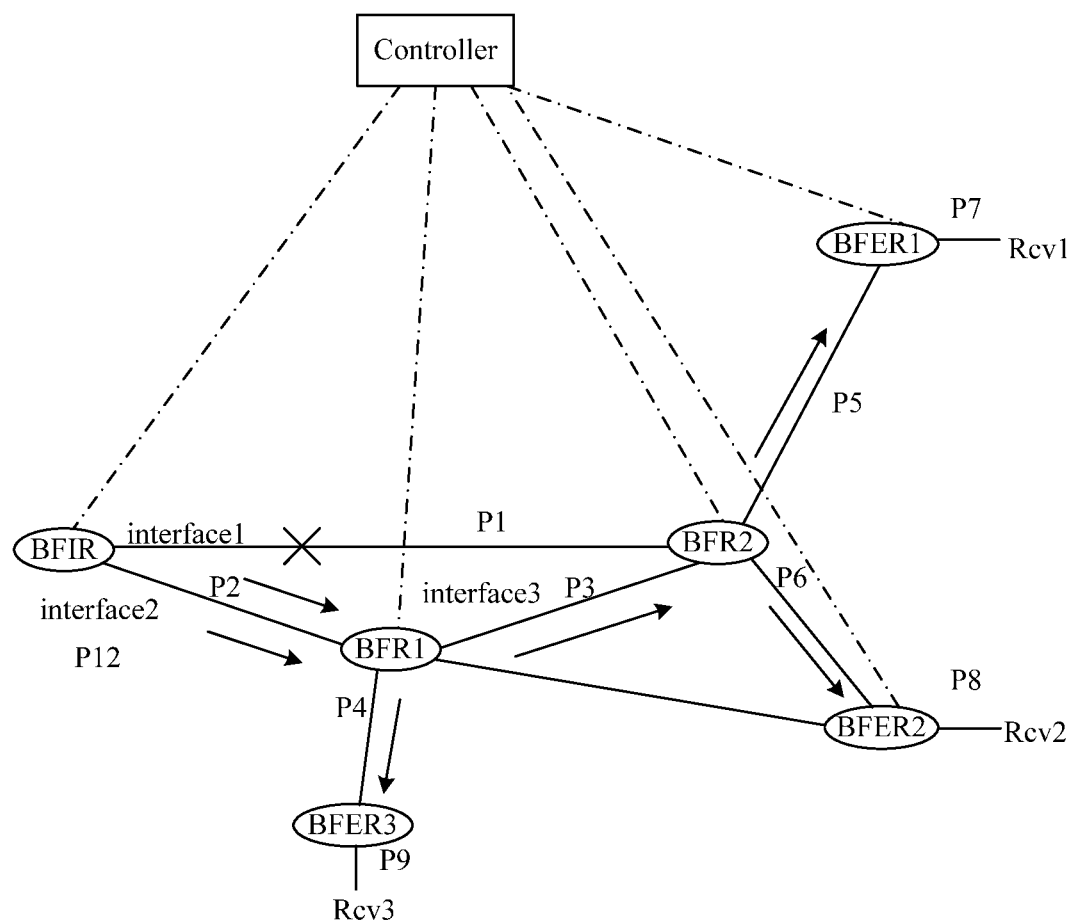
FIG. 6 is a forwarding diagram of a BIER FRR packet according to a second embodiment of the disclosure.

FIG. 6 is a forwarding diagram of a BIER FRR packet according to a second embodiment of the disclosure. As shown in FIG. 6, Pxx represents a bit allocated to a link by a controller. For example, P1 in FIG. 6 represents that the controller allocates P1 to the link of BFIR to BFR2, P2 represents that the controller allocates P2 to the link of BFIR to BFR1, and P12 represents that the controller allocates P12 to the FRR of BFIR to BFR2 (a primary path is BFIR-BFR2, and a backup path is BFIR-BFR1-BFR2). When the path to BFR2 through BFIR fails, the multicast data packet may arrive at BFER1 and BFER2 through a backup path BFIR-BFR1. The FRR forwarding table in the present embodiment may also be referred to FIG. 5. The flow in the present embodiment will be described below with reference to FIG. 5 and FIG. 6. The flow includes the operations as follows.

At S501, when a multicast data packet arrives at a BFIR node, an original BitString is generated as P2, P4, P9, P12, P5, P6, P7, and P8, as shown in FIG. 6.

At S502, a BFIR forwards a packet according to the BitString, and a BIFT table on the BFIR includes two entries: P2 and P12. Therefore, the packet matches the P2 and P12 entries respectively.

The BIFT table on the BFIR is shown in FIG. 5. An adjacency specified by the P2 entry refers to forwarding to BFR1 through a link BFIR-BFR1, and an adjacency specified by the P12 entry refers to forwarding to BFR2 through a link BFIR-BFR2.

At S503, it is checked whether the primary path of P12 fails. If there is no failure, S504 is performed. If there is a failure, S505 is performed.

At S504, a BFIR finally replicates two packets, one is forwarded to BFR1 through the link BFIR-BFR1, and one is forwarded to BFR2 through the link BFIR-BFR2. Both of the two packets have P2 and P12 bits in the BitString being cleared before being sent. After receiving a multicast packet, the other BIER nodes also match a local forwarding entry of the BIER node through the packet, and after matching, the multicast packet is forwarded according to the forwarding entry.

At S505, the packet is sent to the backup adjacency.

An adjacency specified by the P12 entry refers to forwarding to BFR2 through the backup link BFIR-BFR1-BFR2. Before the packet is sent to the backup path, the bit P12 given in a ResetBitmask is cleared, and the bit P3 given in an AddBitmask is added.

A BFIR finally replicates two packets, one is forwarded to BFR1 through the link BFIR-BFR1, and one is forwarded to BFR2 through the link BFIR-BFR1. Before being sent, both of the two packets have P2 and P12 bits in the BitString being cleared, and have P4 and P3 bits in the BitString being set.

At S506, after receiving a multicast packet, the other BIER nodes also match a local forwarding entry of the BIER node through the packet, and after matching, the multicast packet is forwarded according to the forwarding entry.

Figure 7:
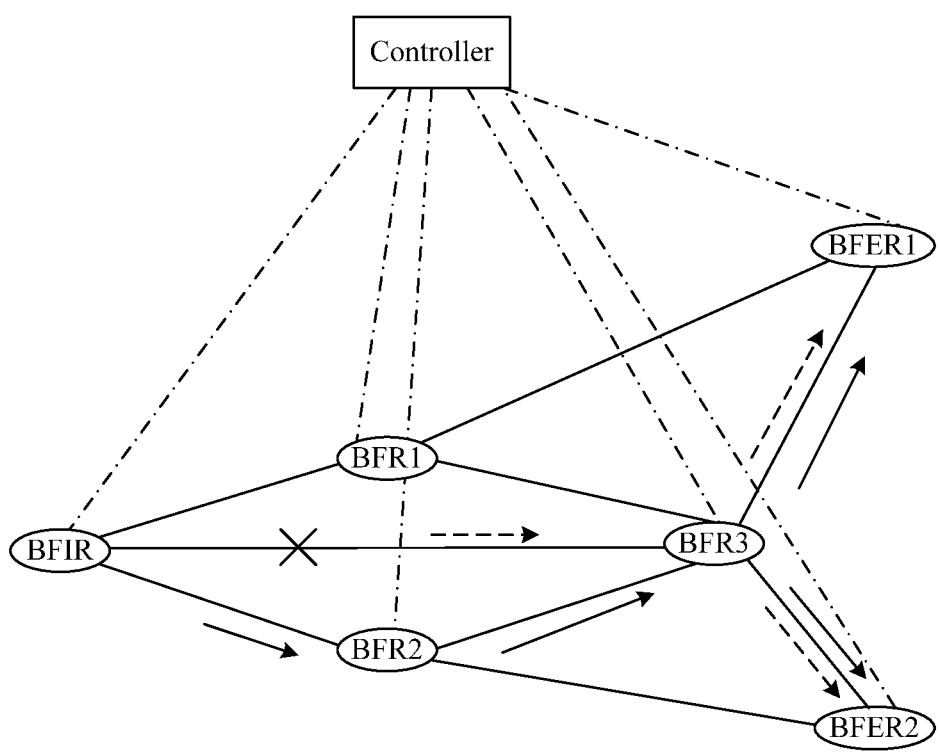
FIG. 7 is a schematic diagram of BIER-TE FRR networking in the related art.

In the related art, the main purpose is to explicitly create a unique backup path for a certain link, so that the link can exist only in one FRR entry. However, when a link belongs to multiple FRR performances, correct protection cannot be achieved. As shown in FIG. 7, there are two backup paths. The correct FRR protection method is: when the primary link BFIR to BFR3 fails, it arrives at BFER1 through the backup path BFIR-BFR1, and arrives at the egress node BFER2 through the backup path BFIR-BFR2.

However, the current FRR protection method in the draft BIER-TE architecture is as follows: it is assumed that the BitPosition of BFIR to BFR3 is 5. When detecting that the primary link BFIR-BFR3 fails, the Adjacency FRR entry is notified, indicating that the primary path has failed, and then the corresponding BitPosition of the failed primary path is recorded. The Adjacency FRR is shown in FIG. 8. The BitPosition in the table is the BitPosition of the primary path of the entire FRR. The BitPosition exists in the BitString of the packet. When the packet is forwarded, it is necessary to check whether a BitPosition has the failure of the above record. If yes, the packet is sent to the backup member. Before the packet is sent, a bit given in a ResetBitmask (the BitPosition of the failed adjacency) is cleared, and a bit given in an AddBitmask (the backup path of a local BFR to an opposite BFR) is added. However, the problem with this method is that there is only one backup path for BFIR-BFR3. That is, the arrival of BFER1 and the arrival of BFER2 take the backup path namely a BFIR-BFR2-BFR3 path. This discards the BFIR-BFR1-BFR3 path. This is unreasonable. In the embodiment of the disclosure, a solution is also proposed for the above problem, which is described below in conjunction with the third to fifth embodiments.

Third Embodiment

Figure 9:
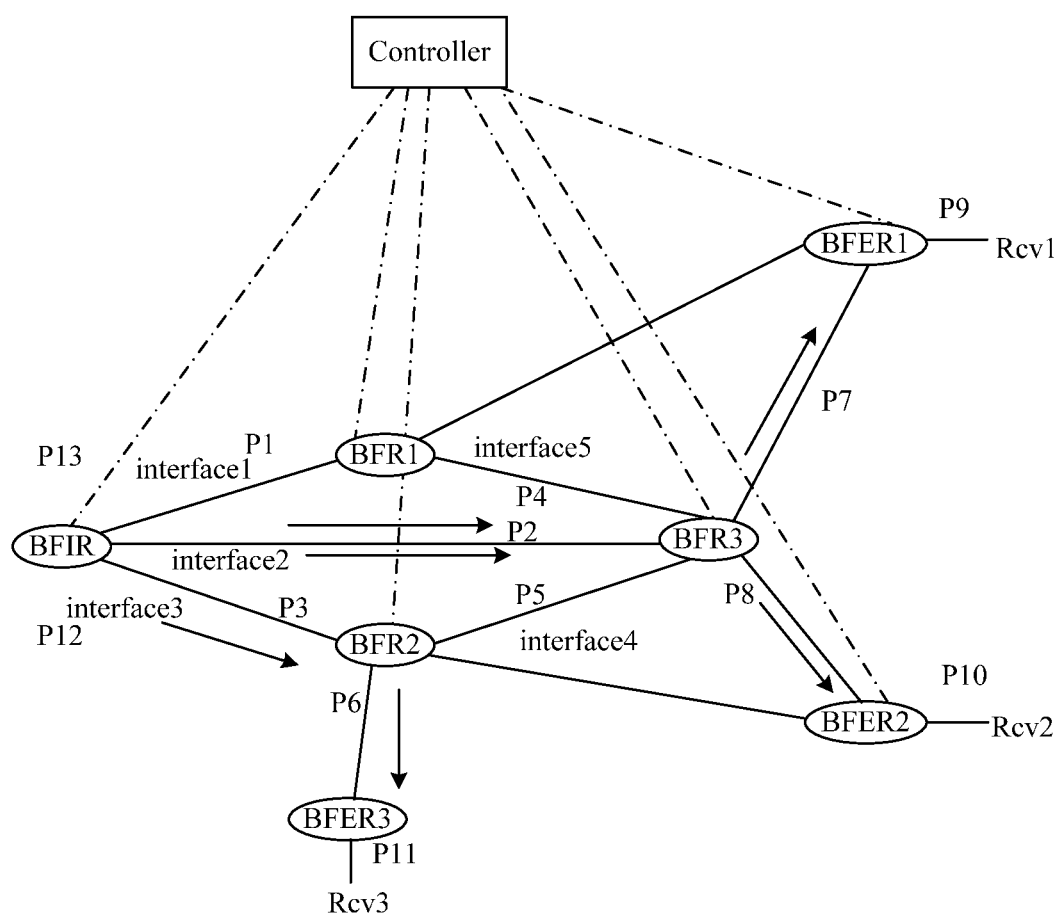
FIG. 9 is a forwarding diagram of a BIER FRR packet according to a third embodiment of the disclosure.

FIG. 9 is a forwarding diagram of a BIER FRR packet according to a third embodiment of the disclosure. FIG. 10 is an FRR forwarding table according to a third embodiment of the disclosure. As shown in FIG. 9, Pxx represents a bit allocated to a link by a controller. For example, P1 in FIG. 9 represents that the controller allocates P1 to the link of BFIR to BFR1, P4 represents that the controller allocates P4 to the link of BFIR1 to BFR3, P12 represents that the controller allocates P12 to the FRR of BFIR to BFR3 (a primary path is BFIR-BFR3, and a backup path is BFIR-BFR2-BFR3), and P13 represents that the controller allocates P13 to another FRR of BFIR to BFR3 (a primary path is BFIR-BFR3, and a backup path is BFIR-BFR1-BFR3). The flow in the present embodiment will be described below, including the operations as follows.

At S601, when a multicast data packet arrives at a BFIR node, an original BitString is generated as P3, P6, P11, P12, P8, P10, P13, P7, and P9, as shown in FIG. 9.

At S602, a BFIR forwards a packet according to the BitString, and a BIFT table on the BFIR includes three entries: P3, P12 and P13. Therefore, the packet matches the P3, P12 and P13 entries respectively.

The BIFT table on the BFIR is shown in FIG. 10. An adjacency specified by the P3 entry refers to forwarding to BFR2 through a link BFIR-BFR2, an adjacency specified by the P12 entry refers to forwarding to BFR3 through a link BFIR-BFR3, and an adjacency specified by the P13 entry refers to forwarding to BFR3 through the link BFIR-BFR3. Then, the BFIR finally replicates two packets, one is forwarded to BFR2 through the link BFIR-BFR2 (this packet may be forwarded to BFER3), and one is forwarded to BFR3 through the link BFIR-BFR3 (this packet may be further replicated by BFR3 into two packets, one is forwarded to BFER1, and one is forwarded to BFER2). Both of the two packets have P3, P12 and P13 bits in the BitString being cleared before being sent. Or, the BFIR finally replicates three packets, one is forwarded to BFR2 through the link BFIR-BFR2 (this packet may be forwarded to BFER3), one is forwarded to BFR3 through the link BFIR-BFR3 (this packet may be forwarded to BFER1), and one is forwarded to BFR3 through the link BFIR-BFR3 (this packet may be forwarded to BFER2). The three packets all have P3, P12 and P13 bits in the BitString being cleared before being sent.

At S603, after receiving a multicast packet, the other BIER nodes also match a local forwarding entry of the BIER node through the packet, and after matching, the multicast packet is forwarded according to the forwarding entry.

Fourth Embodiment

Figure 11:
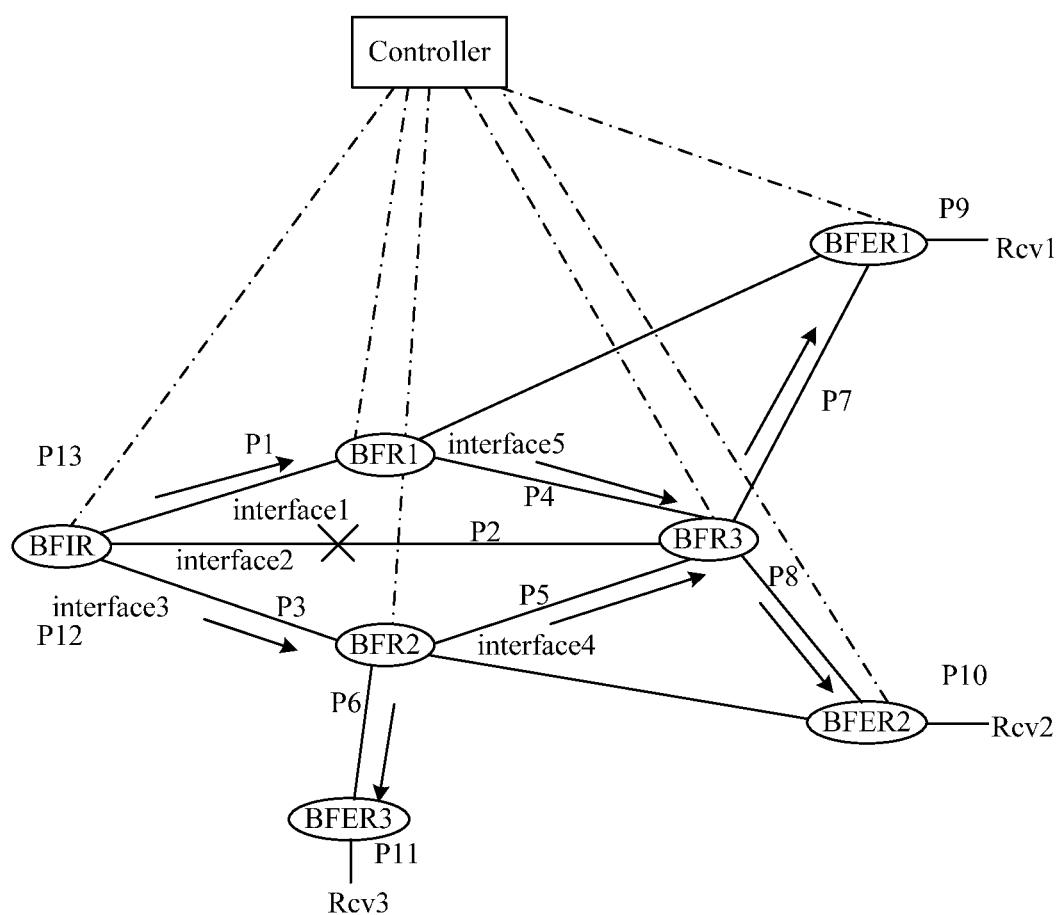
FIG. 11 is a forwarding diagram of a BIER FRR packet according to a fourth embodiment of the disclosure.

FIG. 11 is a forwarding diagram of a BIER FRR packet according to a fourth embodiment of the disclosure. An FRR forwarding table in the present embodiment may refer to FIG. 10. Pxx represents a bit allocated to a link by a controller. For example, P1 in FIG. 11 represents that the controller allocates P1 to the link of BFIR to BFR1, P4 represents that the controller allocates P4 to the link of BFIR1 to BFR3, P12 represents that the controller allocates P12 to a pair of FRRs of BFIR to BFR3, and P13 represents that the controller allocates P13 to another pair of FRRs of BFIR to BFR3. When the path to BFR3 through BFIR fails, the multicast data packet may arrive at BFER1 through a backup path BFIR-BFR1 and at BFER2 through a backup path BFIR-BFR2. The flow in the present embodiment will be described below. The flow includes the operations as follows.

At S701, when a multicast data packet arrives at a BFIR node, an original BitString is generated as P3, P6, P11, P12, P8, P10, P13, P7, and P9, as shown in FIG. 11.

At S702, a BFIR forwards a packet according to the BitString, and a BIFT table on the BFIR includes three entries: P3, P12 and P13. Therefore, the packet matches the P3, P12 and P13 entries respectively.

The BIFT table on the BFIR is shown in FIG. 10. An adjacency specified by the P3 entry refers to forwarding to BFR2 through a link BFIR-BFR2, an adjacency specified by the P12 entry refers to forwarding to BFR3 through a link BFIR-BFR3, and an adjacency specified by the P13 entry refers to forwarding to BFR3 through the link BFIR-BFR3.

The BFIR forwards to BFR2 through the link BFIR-BFR2 by matching the P3 entry.

At S704, it is checked whether the primary path of P12 and P13 fails. If there is no failure, S705 is performed. If there is a failure, S706 is performed.

At S705, the BFIR finally replicates three packets, one is forwarded to BFR2 through the link BFIR-BFR2 (this packet may be forwarded to BFER3), one is forwarded to BFR3 through the link BFIR-BFR3 (this packet may be forwarded to BFER1), and one is forwarded to BFR3 through the link BFIR-BFR3 (this packet may be forwarded to BFER2). The three packets all have P3, P12 and P13 bits in the BitString being cleared before being sent. Or, the BFIR finally replicates two packets, one is forwarded to BFR2 through the link BFIR-BFR2 (this packet may be forwarded to BFER3), and one is forwarded to BFR3 through the link BFIR-BFR3 (this packet may be further replicated by BFR3 into two packets, one is forwarded to BFER1, and one is forwarded to BFER2). Both of the two packets have P3, P12 and P13 bits in the BitString being cleared before being sent. After receiving a multicast packet, the other BIER nodes also match a local forwarding entry of the BIER node through the packet, and after matching, the multicast packet is forwarded according to the forwarding entry.

At S706, the packet is sent to the backup adjacency.

An adjacency specified by the P12 entry refers to forwarding to BFR3 through the backup link BFIR-BFR2-BFR3. Before the packet is sent to the backup path, the bit P12 given in a ResetBitmask is cleared, and the bit P5 given in an AddBitmask is added.

Similarly, an adjacency specified by the P13 entry refers to forwarding to BFR3 through the backup link BFIR-BFR1-BFR3. Before the packet is sent to the backup path, the bit P12 given in a ResetBitmask is cleared, and the bit P4 given in an AddBitmask is added.

The BFIR finally replicates three packets, one is forwarded to BFR2 through the link BFIR-BFR2 (this packet may be forwarded to BFER3), one is forwarded to BFR3 through the link BFIR-BFR1-BFR3 (this packet may be forwarded to BFER1), and one is forwarded to BFR3 through the link BFIR-BFR2-BFR3 (this packet may be forwarded to BFER2). Before being sent, the three packets all have P3, P12 and P13 bits in the BitString being cleared, and have P4 and P5 bits in the BitString being set. Or, the BFIR finally replicates two packets, one is forwarded to BFR2 through the link BFIR-BFR2 (this packet may be replicated by BFR2 into two parts, one is forwarded to BFER3, and one is forwarded to BFER2 through BFR3), and one is forwarded to BFR3 through the link BFIR-BFR1-BFR3 (this packet may be forwarded to BFER1). Before being sent, both the packets have P3, P12 and P13 bits in the BitString being cleared before being sent, and have P4 and P5 bits in the BitString being set.

At S707, after receiving a multicast packet, the other BIER nodes also match a local forwarding entry of the BIER node through the packet, and after matching, the multicast packet is forwarded according to the forwarding entry.

Fifth Embodiment

An FRR entry generated in the fourth embodiment is for the scenario where a link BFIR-BFR3 fails. In fact, for the scenario where the node BFR3 fails, a similar FRR entry may be created, but an AddBitMask given in the corresponding member of the FRR will bypass the BFR3 node. The other processing is exactly the same as that of the fourth embodiment, and will not be described again.

Through the description of the above implementation manners, those skilled in the art can clearly understand that the method according to the above embodiment may be implemented by means of software plus a necessary general hardware platform, and of course, may also be implemented through hardware, but in many cases, the former is a better implementation manner. Based on such understanding, the technical solution of the disclosure, which is essential or contributes to the conventional art, may be embodied in the form of a software product stored in a storage medium (such as a ROM/RAM, a magnetic disk and an optical disc), including a number of instructions for causing a terminal device (which may be a mobile phone, a computer, a server, or a network device, etc.) to perform the methods described in various embodiments of the disclosure.

In the present embodiment, a packet forwarding device is also provided. The device is used to implement the above embodiments and preferred implementation manners, and those have not been described will not be elaborated. As used below, the term "module" may implement a combination of software and/or hardware of a predetermined function. Although the device described in the following embodiments is preferably implemented in software, hardware, or a combination of software and hardware, is also possible and contemplated.

Figure 12:
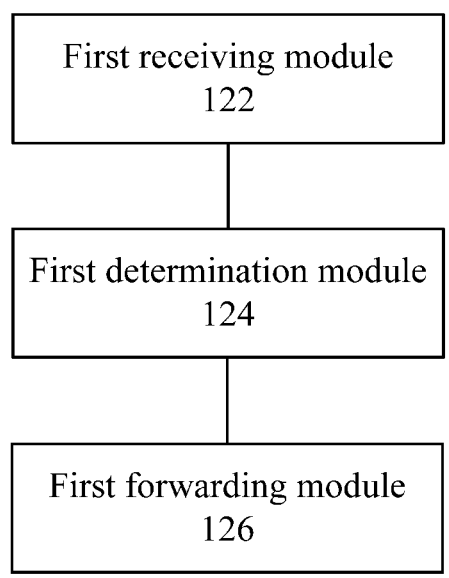
FIG. 12 is a structural block diagram of a first packet forwarding device according to an embodiment of the disclosure.

FIG. 12 is a structural block diagram of a first packet forwarding device according to an embodiment of the disclosure. As shown in FIG. 12, the device includes a first receiving module 122, a first determination module 124 and a first forwarding module 126. The device is described below.

The first receiving module 122 is arranged to receive a packet to be sent to a BFER in a BIER-TE and a path identifier, herein the path identifier is used for indicating a primary path and a backup path through which the packet is sent from a first BFR to a next-hop BFR of the first BFR; the first determination module 124 is connected to the first receiving module 122, and is arranged to determine a bitstring for use in forwarding the packet to the BFER according to the path identifier; and the first forwarding module, 126 is connected to the first determination module 124, and is arranged to fill the bitstring into the packet and forward the packet according to the bitstring.

In an alternative embodiment, the path identifier includes: an adjacency ID allocated by entirely taking the primary path and the backup path as an FRR adjacency.

In an alternative embodiment, the primary path has a capacity of forming different FRR adjacencies with different backup paths.

In an alternative embodiment, the backup path includes a path composed of two or more segments, or the backup path includes a tree path.

In an alternative embodiment, the first forwarding module 126 may also forward the packet according to the bitstring in the following manners that: the packet is forwarded to the first BFR according to the bitstring, herein in the case where it is determined that the primary path is normal, the first BFR forwards the packet to the next-hop BFR of the first BFR through the primary path; in the case where it is determined that the primary path fails, the first BFR forwards the packet to the next-hop BFR of the first BFR through the backup path.

In an alternative embodiment, the operation that the first BFR forwards the packet to the next-hop BFR of the first BFR through the backup path includes that: the first BFR replaces the path identifier in the bitstring filled into the packet with an identifier of the backup path; and the first BFR forwards the packet to the next-hop BFR of the first BFR through the backup path according to the identifier of the backup path.

In an alternative embodiment, a BIFT corresponding to the path identifier includes information of the primary path and information of the backup path, herein the information of the primary path includes at least one of information of an egress on the primary path or information of a next-hop BFR; and/or, the information of the backup path includes at least one of information of an egress on the first path segment on the backup path or information of a next-hop BFR, together with an AddBitmask, and a ResetBitMask, herein the AddBitmask is used for identifying other path segments after the first path segment on the backup path, and the ResetBitMask includes path identifiers required to be cleared, including the path identifier.

In an alternative embodiment, the BIFT may be issued by a controller.

In an alternative embodiment, the path identifier may be issued by the controller.

Figure 13:
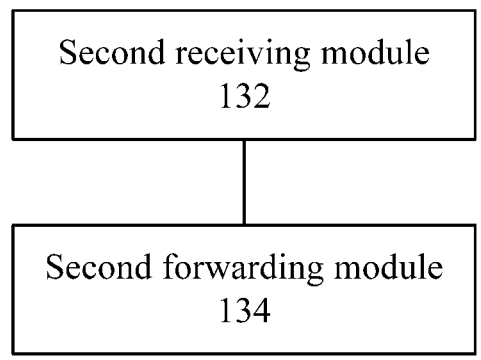
FIG. 13 is a structural block diagram of a second packet forwarding device according to an embodiment of the disclosure.

FIG. 13 is a structural block diagram of a second packet forwarding device according to an embodiment of the disclosure. As shown in FIG. 13, the device includes a second receiving module 132 and a second forwarding module 134. The device is described below.

The second receiving module 132 is arranged to receive a packet to be sent to a BFER in a BIER-TE; and the second forwarding module 134 is connected to the second receiving module 132, and is arranged to forward the packet according to a path identifier in a bitstring filled into the packet, herein the path identifier in the bitstring is used for indicating a primary path and a backup path through which the packet is sent to a next-hop BFR.

In an alternative embodiment, the path identifier includes: an adjacency ID allocated by entirely taking the primary path and the backup path as an FRR adjacency.

In an alternative embodiment, the primary path may form different FRR adjacencies with different backup paths. In the present embodiment, a primary path may correspond to more than two backup paths. When the primary path reaches different next-hop BFRs, different backup paths may be arranged for the primary path, thereby avoiding the problem of using only one backup path and not using other backup paths.

In an alternative embodiment, the backup path includes a path composed of two or more segments, or the backup path includes a tree path.

In an alternative embodiment, the second forwarding module 134 may forward the packet according to a path identifier in a bitstring filled into the packet in the following manners that: in the case where it is determined that the primary path is normal, the packet is forwarded to the next-hop BFR through the primary path; in the case where it is determined that the primary path fails, the packet is forwarded to the next-hop BFR through the backup path.

In an alternative embodiment, the second forwarding module 134 may forward the packet to the next-hop BFR through the backup path in the following manners that: the path identifier in the bitstring filled into the packet is replaced with an identifier of the backup path; and the packet is forwarded to the next-hop BFR through the backup path according to the identifier of the backup path.

In an alternative embodiment, a BIFT corresponding to the path identifier includes information of the primary path and information of the backup path, herein the information of the primary path includes at least one of information of an egress on the primary path or information of a next-hop BFR; and/or, the information of the backup path includes at least one of information of an egress on the first path segment on the backup path or information of a next-hop BFR, together with an AddBitmask, and a ResetBitMask, herein the AddBitmask is used for identifying other path segments after the first path segment on the backup path, and the ResetBitMask includes path identifiers required to be cleared, including the path identifier.

In an alternative embodiment, the BIFT is issued by a controller.

Figure 14:
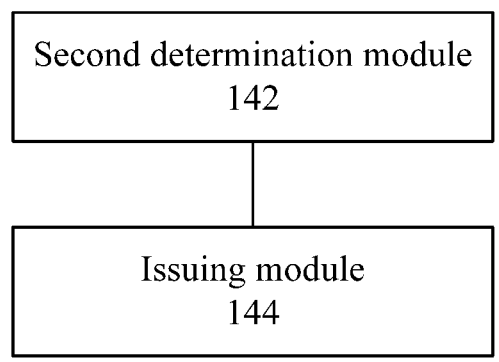
FIG. 14 is a structural block diagram of a third packet forwarding device according to an embodiment of the disclosure.

FIG. 14 is a structural block diagram of a third packet forwarding device according to an embodiment of the disclosure. As shown in FIG. 14, the device includes a second determination module 142 and an issuing module 144. The device is described below.

The second determination module 142 is arranged to determine a path identifier for use in forwarding a packet, herein the path identifier is used for indicating a primary path and a backup path through which the packet is sent from a first BFR to a next-hop BFR of the first BFR; and the issuing module 144 is connected to the second determination module 142, and is arranged to issue the determined path identifier to a BFR in a BIER-TE, herein the path identifier is for use in forwarding the packet by the BFR.

In an alternative embodiment, the path identifier includes: an adjacency ID allocated by entirely taking the primary path and the backup path as an FRR adjacency.

In an alternative embodiment, the primary path has a capacity of forming different FRR adjacencies with different backup paths.

In an alternative embodiment, the backup path includes a path composed of two or more segments, or the backup path includes a tree path.

In an alternative embodiment, a BIFT corresponding to the path identifier carried in the bitstring includes information of the primary path and information of the backup path, herein the information of the primary path includes at least one of information of an egress on the primary path or information of a next-hop BFR; and/or, the information of the backup path includes at least one of information of an egress on the first path segment on the backup path or information of a next-hop BFR, together with an AddBitmask, and a ResetBitMask, herein the AddBitmask is used for identifying other path segments after the first path segment on the backup path, and the ResetBitMask includes path identifiers required to be cleared, including the path identifier.

It is to be noted that each of the above modules may be implemented by software or hardware. For the latter, the above may be implemented by, but not limited to, the following manners that the above modules are all located in the same processor; or, the above modules are located in multiple processors respectively.

The embodiments of the disclosure also provide a storage medium. Alternatively, in the present embodiment, the storage medium may be arranged to store a program code for performing the operations as follows.

At S1, a packet to be sent to a BFER in a BIER-TE and a path identifier are received, herein the path identifier is used for indicating a primary path and a backup path through which the packet is sent from a first BFR to a next-hop BFR of the first BFR.

At S2, a bitstring for use in forwarding the packet to the BFER is determined according to the path identifier.

At S3, the bitstring is filled into the packet, and the packet is forwarded according to the bitstring.

The embodiments of the disclosure also provide a storage medium. Alternatively, in the present embodiment, the storage medium may be arranged to store a program code for performing the operations as follows.

At S1, a packet to be sent to a BFER in a BIER-TE is received.

At S2, the packet is forwarded according to a path identifier in a bitstring filled into the packet, herein the path identifier in the bitstring is used for indicating a primary path and a backup path through which the packet is sent to a next-hop BFR.

The embodiments of the disclosure also provide a storage medium. Alternatively, in the present embodiment, the storage medium may be arranged to store a program code for performing the operations as follows.

At S1, a path identifier for use in forwarding a packet is determined, herein the path identifier is used for indicating a primary path and a backup path through which the packet is sent from a first BFR to a next-hop BFR of the first BFR.

At S2, the determined path identifier is issued to a BFR in a BIER-TE, herein the path identifier is for use in forwarding the packet by the BFR.

Alternatively, in the present embodiment, the storage medium may include, but is not limited to, various media capable of storing a program code such as a U disk, a Read-Only Memory (ROM), a Random Access Memory (RAM), a mobile hard disk, a magnetic disk or an optical disc.

Alternatively, in the above embodiment involving the storage medium, a processor performs the above operations in accordance with the program code already stored in the storage medium.

Alternatively, a specific example in the above embodiment involving the storage medium may refer to the examples described in the above embodiments and alternative implementation manners, and details are not described herein.

As can be seen from the above embodiments, the disclosure may complete specified path forwarding of a specific traffic in a BIER network, and compensates for the shortcomings that resource planning cannot be performed for the specific traffic in the BIER network and then forwarding is performed according to the specified path. The application scenario and deployment environment of the BIER technology are greatly expanded. The multicast flow and unicast traffic can complete the specified path forwarding function in the BIER network, which has good adaptability and development prospects.

Those of ordinary skill in the art may understand that all or some of the operations in the above method may be completed by instructing relevant hardware (e.g., processor) through a program. The program may be stored in a computer-readable storage medium such as a ROM, a magnetic disk or an optical disc. Alternatively, all or some of the operations in the above embodiments may be implemented by using one or more integrated circuits. Accordingly, each module/unit in the above embodiments may be implemented in the form of hardware. For example, corresponding functions thereof are implemented by means of an integrated circuit. Each module/unit may also be implemented in the form of a software function module. For example, corresponding functions thereof are implemented by executing program instructions stored in a memory by the processor. The present application is not limited to the combination of hardware and software in any specific form.

It is to be noted that various other embodiments may also be provided for the present application. Various corresponding modifications and variations may be made by those skilled in the art without departing from the spirit and scope of the application. However, these corresponding modifications and variations are intended to fall within the scope of the appended claims of the present application.

INDUSTRIAL APPLICABILITY

By means of the technical solutions provided in the embodiments of the disclosure, a packet to be sent to a BFER in a BIER-TE and a path identifier are received, herein the path identifier is used for indicating a primary path and a backup path through which the packet is sent from a first BFR to a next-hop BFR of the first BFR; a bitstring for use in forwarding the packet to the BFER is determined according to the path identifier; and the bitstring is filled into the packet, and the packet is forwarded according to the bitstring. The problem in the related art that a configuration path cannot be correctly and reasonably protected to result in waste of resources is solved, thereby achieving the effect of reasonably and effectively protecting a configuration path to avoid waste of resources.

The invention claimed is:

1. A packet forwarding method, comprising:
receiving a packet to be sent to a Bit-Forwarding Egress Router (BFER) in a Bit Index Explicit Replication-Traffic Engineering (BIER-TE), and a path identifier, wherein the path identifier is used for indicating a primary path and a backup path through which the packet is sent from a first Bit Forwarding Router (BFR) to a next-hop BFR of the first BFR;
determining, according to the path identifier, a bitstring for use in forwarding the packet to the BFER; and
filling the bitstring into the packet, and forwarding the packet according to the bitstring.

2. The method according to claim 1, wherein the path identifier comprises:
an adjacency Identification (ID) allocated by entirely taking the primary path and the backup path as a Fast Re-Route (FRR) adjacency.

3. The method according to claim 2, wherein the primary path has a capability of forming different FRR adjacencies with different backup paths.

4. The method according to claim 2, wherein the backup path comprises a path composed of two or more segments, or the backup path comprises a tree path.

5. The method according to claim 2, wherein a BIER-TE Forwarding Table (BIFT) corresponding to the path identifier comprises information of the primary path and information of the backup path,
wherein the information of the primary path comprises at least one of information of an egress on the primary path or information of the next-hop BFR; and/or,
the information of the backup path comprises at least one of information of an egress on the first path segment on the backup path or information of the next-hop BFR, together with an AddBitmask and a ResetBitMask, wherein the AddBitmask is used for identifying other path segments after the first path segment on the backup path, and the ResetBitMask comprises path identifiers required to be cleared, comprising the path identifier.

6. The method according to claim 1 or 2, wherein the primary path has a capability of forming different FRR adjacencies with different backup paths.

7. The method according to claim 1 or 2, wherein the backup path comprises a path composed of two or more segments, or the backup path comprises a tree path.

8. The method according to claim 1, wherein forwarding the packet according to the bitstring comprises:
forwarding the packet to the first BFR according to the bitstring, wherein in the case where it is determined that the primary path is normal, the first BFR forwards the packet to the next-hop BFR of the first BFR through the primary path; in the case where it is determined that the primary path fails, the first BFR forwards the packet to the next-hop BFR of the first BFR through the backup path.

9. The method according to claim 8, wherein forwarding, by the first BFR, the packet to the next-hop BFR of the first BFR through the backup path comprises:
replacing, by the first BFR, the path identifier in the bitstring filled into the packet with an identifier of the backup path; and
forwarding, by the first BFR, the packet to the next-hop BFR of the first BFR through the backup path according to the identifier of the backup path.

10. The method according to claim 1, wherein a BIER-TE Forwarding Table (BIFT) corresponding to the path identifier comprises information of the primary path and information of the backup path,
wherein the information of the primary path comprises at least one of information of an egress on the primary path or information of the next-hop BFR; and/or,
the information of the backup path comprises at least one of information of an egress on the first path segment on the backup path or information of the next-hop BFR, together with an AddBitmask and a ResetBitMask, wherein the AddBitmask is used for identifying other path segments after the first path segment on the backup path, and the ResetBitMask comprises path identifiers required to be cleared, comprising the path identifier.

11. The method according to claim 10, wherein the BIFT is issued by a controller.

12. The method according to claim 1, wherein the path identifier is issued by the controller.

13. A packet forwarding method, comprising:
- determining a path identifier for use in forwarding a packet, wherein the path identifier is used for indicating a primary path and a backup path through which the packet is sent from a first Bit Forwarding Router (BFR) to a next-hop BFR of the first BFR; and
- issuing the determined path identifier to a BFR in a Bit Index Explicit Replication-Traffic Engineering (BIER-TE), wherein the path identifier is for use in forwarding the packet by the BFR.

14. The method according to claim 13, wherein the path identifier comprises:
- an adjacency Identification (ID) allocated by entirely taking the primary path and the backup path as a Fast Re-Route (FRR) adjacency.

15. The method according to claim 14, wherein the primary path has a capability of forming different FRR adjacencies with different backup paths.

16. The method according to claim 14, wherein the backup path comprises a path composed of two or more segments, or the backup path comprises a tree path.

17. The method according to claim 13, wherein the primary path has a capability of forming different FRR adjacencies with different backup paths.

18. The method according to claim 13, wherein the backup path comprises a path composed of two or more segments, or the backup path comprises a tree path.

19. The method according to claim 13, wherein a BIER-TE Forwarding Table (BIFT) corresponding to the path identifier comprises information of the primary path and information of the backup path,
- wherein the information of the primary path comprises at least one of information of an egress on the primary path or information of a next-hop BFR; and/or,
- the information of the backup path comprises at least one of information of an egress on the first path segment on the backup path or information of a next-hop BFR, together with an AddBitmask, and a ResetBitMask, wherein the AddBitmask is used for identifying other path segments after the first path segment on the backup path, and the ResetBitMask comprises path identifiers required to be cleared, comprising the path identifier.

20. A packet forwarding device, comprising:
- a memory storing processor-executable instructions; and
- a processor arranged to execute the stored processor-executable instructions to perform steps of:
- receiving a packet to be sent to a Bit-Forwarding Egress Router (BFER) in a Bit Index Explicit Replication-Traffic Engineering (BIER-TE), and a path identifier, wherein the path identifier is used for indicating a primary path and a backup path through which the packet is sent from a first Bit Forwarding Router (BFR) to a next-hop BFR of the first BFR;
- determining, according to the path identifier, a bitstring for use in forwarding the packet to the BFER; and
- filling the bitstring into the packet, and forwarding the packet according to the bitstring.

\* \* \* \* \*